(12) United States Patent
Uimonen et al.

(10) Patent No.: US 10,410,045 B2
(45) Date of Patent: Sep. 10, 2019

(54) AUTOMATED FACIAL RECOGNITION SYSTEMS AND METHODS

(71) Applicant: Intel Corporation, Santa Clara, CA (US)

(72) Inventors: Jaska Uimonen, Helsinki (FI); Ismo Puustinen, Helsinki (FI)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 15/078,686

(22) Filed: Mar. 23, 2016

(65) Prior Publication Data

US 2017/0277938 A1  Sep. 28, 2017

(51) Int. Cl.
*G06K 9/00* (2006.01)

(52) U.S. Cl.
CPC ............ *G06K 9/00261* (2013.01); *G06K 2009/00322* (2013.01); *G06K 2009/00328* (2013.01)

(58) Field of Classification Search
USPC ......... 340/5.52; 348/143; 382/103, 115, 118, 382/195
See application file for complete search history.

(56) References Cited

U.S. PATENT DOCUMENTS

| | | | | |
|---|---|---|---|---|
| 5,781,650 A * | 7/1998 | Lobo | ............... | G06K 9/00221 382/118 |
| 7,912,246 B1 * | 3/2011 | Moon | ............... | G06K 9/00221 382/103 |
| 8,396,264 B2 * | 3/2013 | Moriyama | ....... | G06F 17/30247 382/118 |
| 8,526,742 B2 * | 9/2013 | Kuriyama | ......... | G06K 9/00221 382/195 |
| 8,565,539 B2 * | 10/2013 | Chao | ................. | G06K 9/00221 382/115 |
| 8,818,034 B2 * | 8/2014 | Zhang | ............... | G06K 9/00221 340/5.52 |
| 9,189,681 B2 * | 11/2015 | Kunieda | ........... | G06K 9/00288 |
| 9,607,653 B2 * | 3/2017 | Loscalzo | .......... | G06F 17/30256 |

(Continued)

OTHER PUBLICATIONS

International Search Report and Written Opinion issued in PCT Application No. PCT/US2017/014599, dated Apr. 18, 2017, 12 pages.

*Primary Examiner* — Xuemei G Chen
(74) *Attorney, Agent, or Firm* — Grossman, Tucker, Perreault & Pfleger, PLLC

(57) ABSTRACT

A facial recognition system determines an estimated biological age of a subject in a current image. A facial recognition controller identifies the subject in the current image using a number of historical images, at least one of which includes the subject and a logically associated identifier. The system compares the estimated biological age of the subject to a defined threshold value. The system determines a temporal difference between a time/date logically associated with the current image and a time/date logically associated with the historical image. If the estimated biological age of the subject in the current image is less than a defined age threshold and the temporal difference between the time/date logically associated with the current image and a time/date logically associated with the historical image is less than a temporal threshold, the identifier logically associated with the historical image is logically associated with the current image.

19 Claims, 6 Drawing Sheets

(56) References Cited

U.S. PATENT DOCUMENTS

| | | | |
|---|---|---|---|
| 9,626,597 B2* | 4/2017 | Xiong | G06K 9/00288 |
| 2007/0003113 A1 | 1/2007 | Goldberg | |
| 2012/0002878 A1 | 1/2012 | Kuriyama | |
| 2012/0314044 A1* | 12/2012 | Ogawa | G06K 9/00221 |
| | | | 348/77 |
| 2014/0079299 A1 | 3/2014 | Sukegawa et al. | |
| 2014/0310271 A1 | 10/2014 | Song et al. | |
| 2015/0356348 A1 | 12/2015 | Kaneda | |
| 2016/0094812 A1* | 3/2016 | Chen | H04N 7/183 |
| | | | 348/143 |
| 2017/0188093 A1* | 6/2017 | Pan | H04N 21/4415 |
| 2017/0211838 A1* | 7/2017 | Child | F24F 11/0034 |
| 2017/0249670 A1* | 8/2017 | Awad | G06Q 30/0269 |

* cited by examiner

AUTOMATED FACIAL RECOGNITION SYSTEMS AND METHODS

TECHNICAL FIELD

The present disclosure relates to autonomous facial recognition systems and methods.

BACKGROUND

Advances in facial recognition software have propagated to relatively low cost desktop image editing software such as Adobe Lightroom and Apple Photos. Such facial recognition software has even propagated to relatively low cost consumer and prosumer cameras. In most instances, the facial recognition software is intended to assist the software or device user in organizing or arranging images in an intuitive manner that facilitates locating groups of related images using plain syntax rather than complex search terms (e.g., find images of Uncle George or Aunt Martha). Some facial recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation. Recognition algorithms can be divided into two main approaches, geometric, which looks at distinguishing features, or photometric, which is a statistical approach that distills an image into values and compares the values with templates to eliminate variances.

When such systems analyze the facial characteristics of infants or small children, the process is often quite error prone and may result in misidentification of siblings or misidentification of different infants due to the similarity inherent in the facial features of many infants and small children.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
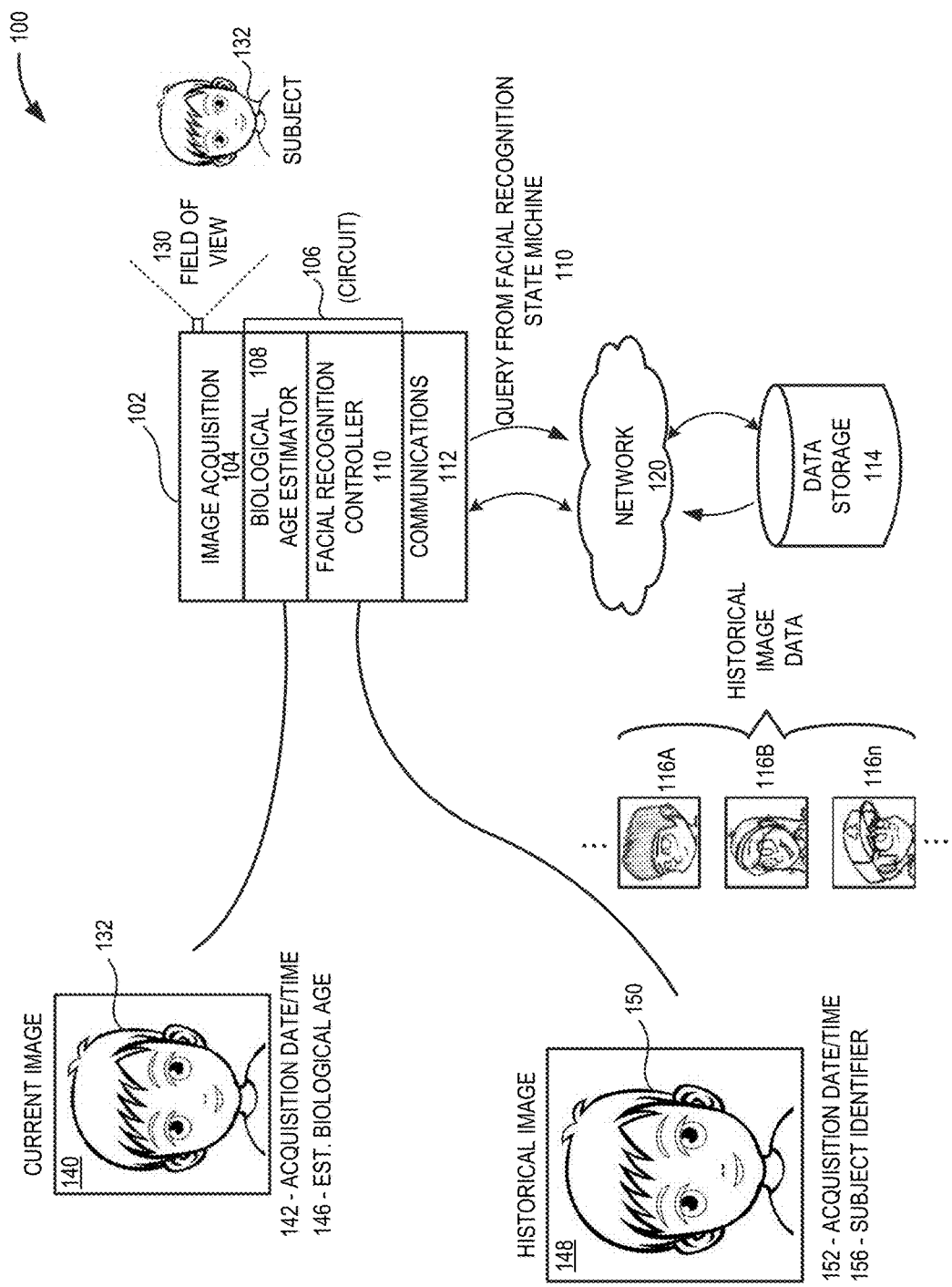
FIG. 1 provides a schematic diagram of an illustrative facial recognition system, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

A relationship exists between physiological changes in a young child's facial structure and the chronological age of a child. In general terms, the rate of physiological change in a child's facial structure is inversely proportional to the chronological age of the child. Thus, the accuracy of automated facial recognition of children in systems using historical images as a basis for identification may be improved by combining a face age analysis of a subject child appearing in a current image with a calculated temporal difference between a time/date stamp of the current image with the time/date stamp of the historical image used to identify the subject child.

By way of example, the current image includes a child subject having a determined estimated biological age of 24 months. A first selected historical image that includes a child subject with a logically associated identifier of "ALAN" includes a logically associated time stamp indicating the image was taken 12 months ago. It is unlikely that the child subject in the current image is "ALAN" due to the physiological changes that occur in the structure of a child's face between the ages of 12 months and 24 months, thus, the system does not logically associate the identifier "ALAN" with the child subject in the current image. A second selected historical image that includes a child subject with a logically associated identifier of "BRUCE" includes a logically associated time stamp indicating the image was taken 1 month ago. It is likely the child subject in the current image is "BRUCE" since very little physiological change in the child's facial structure would be expected to occur over a one-month period. Thus, the system may logically associate the identifier "BRUCE" with the child subject appearing in the current image.

The relationship between physiological changes in facial structure and biological age varies from individual to individual. Further, the rate of physiological change in facial structure varies with biological age. Thus, use of a single threshold value for the allowable temporal difference between the time/date stamp of a current image that includes a child subject and the time/date stamp of the historical image used to identify the child subject would result in an unacceptably high error rate if the temporal threshold were set too high (e.g., 6 months or more) or an unacceptably high identification miss rate if the temporal threshold were set too low (e.g., 1 month or less). The systems and methods described herein may address this issue through the use of a temporal threshold that is calculated or otherwise determined (e.g., through the use of a look-up table or similar data structure) based at least in part on the estimated biological age of the child subject appearing in the current image.

An autonomous facial recognition system is provided. The system may include a means for determining whether an estimated biological age of a subject in a current image acquired by a communicably coupled image sensor is less than a defined age threshold; a means for determining whether a temporal difference between an acquisition time logically associated with the current image and an acquisition time logically associated with a historical image stored on a communicably coupled storage device is less than a defined temporal threshold, the historical image including the subject and a logically associated subject identifier; and a means for logically associating the subject identifier with the subject responsive to determining the estimated age of the subject is less than the defined age threshold and the temporal difference is less than the defined temporal threshold.

A storage device that includes machine-readable instructions is provided. The machine-readable instructions may, when executed by a circuit, cause the circuit to provide a facial recognition controller. In operation, the facial recognition controller may determine whether an estimated biological age of a subject in a current image acquired by a communicably coupled image sensor is less than a defined age threshold; determine whether a temporal difference between an acquisition time logically associated with the current image and an acquisition time logically associated with a historical image that includes the subject and a logically associated subject identifier is less than a defined temporal threshold; and, responsive to determining the estimated biological age of the subject is less than the defined age threshold and the temporal difference is less than the temporal threshold, logically associating the subject identifier with the current image.

An automated facial recognition method is also provided. The method may include determining, by a facial recognition controller, whether an estimated biological age of a subject in a current image acquired by an image sensor communicably coupled to the facial recognition controller is less than a defined age threshold. The method may further include determining by the facial recognition controller, whether a temporal difference between an acquisition time logically associated with the current image and an acquisition time logically associated with a historical image stored on a communicably coupled storage device is less than a defined temporal threshold, the historical image including the subject and a logically associated subject identifier. The method may additionally include, responsive to determining the estimated age of the subject is less than the defined age threshold and the temporal difference is less than the temporal threshold, logically associating, by the facial recognition controller, the subject identifier with the current image.

A facial recognition controller is provided. The controller may include a circuit and a storage device communicably coupled to the circuit. The storage device includes machine readable instructions that, when executed by the circuit, may cause the circuit to provide a facial recognition controller. The facial recognition controller may, in operation: determine whether an estimated biological age of a subject in a current image acquired by an image sensor communicably coupled to the circuit is less than a defined age threshold; determine whether a temporal difference between an acquisition time logically associated with the current image and an acquisition time logically associated with a historical image that includes the subject and a logically associated subject identifier is less than a defined temporal threshold; and, responsive to determining the estimated biological age of the subject is less than the defined age threshold and the temporal difference is less than the temporal threshold, logically associate the subject identifier with the current image.

A portable electronic device is also provided. The portable electronic device may include an image sensor; a circuit communicably coupled to the image sensor, and a storage device communicably coupled to the circuit. The storage device may include machine readable instructions that, when executed by the circuit, cause the circuit to provide a facial recognition controller. The facial recognition controller determines whether an estimated biological age of a subject in a current image acquired by the image sensor is less than a defined age threshold; determines whether a temporal difference between an acquisition time logically associated with the current image and an acquisition time logically associated with a historical image that includes the subject and a logically associated subject identifier is less than a defined temporal threshold; and responsive to determining the estimated biological age of the subject is less than the defined age threshold and the temporal difference is less than the temporal threshold, logically associating the subject identifier with the current image.

FIG. 1 provides a high-level schematic diagram of an illustrative facial recognition system 100, in accordance with at least one embodiment of the present disclosure. As depicted in FIG. 1, a portable electronic device 102 may include an image acquisition device or system 104, biological age estimator circuitry 108, a facial recognition controller 110, and a communications interface 112. The portable electronic device 102 may be communicably coupled via one or more networks 120 to one or more remote data storage devices 114 that stores, holds, or otherwise contains any number of historical images 116A-116n (collectively "historical images 116"). A subject 132 appears within a field-of-view 130 of the image acquisition device 104.

In operation, the image acquisition device 104 acquires current image 140 that includes the subject 132. The image acquisition device 104 may logically associate with the current image 140 a date/time stamp 142 indicative of the date and time that the image acquisition system 104 acquired the current image 140. In embodiments, the date/time stamp 142 may be included as metadata or header data that is logically associated with the current image 140. The biological age estimator circuitry 108 generates an estimated biological age 146 of the subject appearing in the current image 140. The facial recognition controller 110 may attempt to identify the subject 132 in the current image 140 by selecting at least one historical image 148 that includes a subject 150 identified by the facial recognition controller 110 as the subject 132 included in the current image 140. The facial recognition controller 110 may use any current or future developed facial recognition technique or technology to identify the subject 132 in the current image 140.

Based at least in part on the estimated biological age 146 of the subject 132 in the current image 140, and a temporal difference between the date/time stamp 142 logically associated with the current image 140 and the date/time stamp 152 logically associated with the at least one historical image 148, the facial recognition controller 110 may determine a level of confidence that the subject 132 in the current image 140 is the same as the subject 150 in the at least one historical image 148. In at least some implementations, the facial recognition controller 110 may determine the level of confidence: first, by determining a temporal difference between the date/time stamp 142 logically associated with the current image 140 and the date/time stamp 152 logically associated with the historical image 148; and second, by comparing the determined temporal difference against a temporal threshold value. In some implementations, the facial recognition controller 110 may select the temporal threshold value based at least in part on the estimated biological age 146 of the subject 132 in the current image 140.

In implementations where the facial recognition controller 110 is used to identify a subject child 132 who appears in the current image 140, the facial recognition controller 110 may first determine whether the estimated biological age 146 of the subject child 132 falls below a defined age threshold value used to define a "child" to the facial recognition controller 110. In such implementations, the age threshold value may be about 3 years of age; about 5 years of age; about 10 years of age; about 15 years of age; or about 20 years of age. Once the facial recognition controller 110 determines the subject 132 is a child, the facial recognition controller 110 may determine an appropriate temporal threshold value. In some implementations, an appropriate temporal threshold value may be selected based at least in part on the estimated biological age of the child subject 132 that appears in the current image 140. The facial recognition controller 110 compares the temporal difference between the acquisition date/time 142 logically associated with the current image 140 and the acquisition date/time 152 logically associated with the historical image 148 against the temporal threshold value. If the temporal difference is less than or equal to the temporal threshold value (i.e., the current image 140 and the selected at least one historical image 148 are sufficiently close in time), the facial recognition controller 110 may logically associate the historical image subject identifier 156 with the current image 140. If, on the other hand, the temporal difference is greater than the temporal threshold value (i.e., the current image 140 and the selected at least one historical image 148 are NOT sufficiently close in time), the facial recognition controller 110 may identify the child subject 132 in the current image 140 as a "NEW" subject. In such an instance, the facial recognition controller 110 may solicit user input that includes at least one identifier for logical association with the child subject 132.

The portable electronic device 102 may include any number and/or combination of systems and/or devices capable of acquiring an image of a subject 132. The portable electronic device 102 may include a processor or microprocessor based device such as a smartphone, wearable computer, ultraportable computer, fixed or still camera, motion picture camera, or similar. In some implementations, the portable electronic device 102 may include circuitry that provides some or all of the biological age estimator circuitry 108, the facial recognition controller 110, and/or the communications interface 112. In some implementations, the portable electronic device 102 may include one or more storage devices 114 that are used to store or otherwise retain at least some of the number of historical images 116. In other implementations, the portable electronic device 102 may be communicably coupled via one or more networks 120 to one or more remote storage devices 114 used to store or otherwise retain at least some of the number of historical images 116.

The image acquisition device 104 may include any number and/or combination of current and/or future developed image acquisition devices and/or systems. In some implementations the image acquisition device 104 may include at least one sensor capable of generating an output signal that includes data or information representative of objects and items appearing within a field-of-view 130 of the image acquisition device 104. In embodiments, the image acquisition device 104 may include at least one image sensor that collects or otherwise acquires data or information and generates an output signal indicative of a still or non-moving image of the field-of-view 130. In other embodiments, the image acquisition device 104 may include at least one image sensor that collects or otherwise acquires data or information and generates an output signal indicative of a moving image, moving picture, or movie of the field-of-view 130.

The image sensor 104 may use any current or future developed image acquisition technology such as a charge-coupled device (CCD) image sensor or a complementary metal-oxide semiconductor (CMOS) image sensor. In some implementations, image sensor 104 may be positioned proximate a fixed or variable focal length optical lens assembly. The image sensor 104 may be communicably coupled to the biological age estimator circuitry 108 and/or the facial recognition controller 110 via one or more buses or similar communications links.

The biological age estimator circuitry 108 may include one or more circuits, processors, microprocessors, or similar assemblies of electrical components and/or semiconductor devices to provide a system capable of estimating a biological age of a subject 132 included in image data provided by the image acquisition device 104. The biological age estimator circuitry 108 may autonomously generate an estimated biological age 146 of the subject 132 based on one or more autonomous age estimation techniques. In some embodiments, the biological age estimator circuitry 108 may autonomously perform face preprocessing, facial component localization, and facial feature extraction preparatory to performing one or more hierarchical age estimation techniques. In some implementations, the biological age estimator circuitry 108 may implement one or more machine-learning techniques to refine the biological age estimation technique. In some implementations, the biological age estimator circuitry 108 may locally or remotely access one or more face-aging databases such as FG-NET, MORPH Album 2, and/or PCSO databases. In embodiments, the biological age estimator circuitry 108 may generate an output that includes data indicative of an estimated biological age 146 of the subject 132 appearing in the current image 140. In some implementations, the data indicative of the estimated biological age 146 of the subject 132 may be logically associated with the current image 140.

The facial recognition controller 110 may include any number and/or combination of any current and/or future developed systems and/or devices capable of receiving image data that includes one or more subjects 132, analyzing the image data and identifying at least some of the one or more subjects 132 included in the image data. The facial recognition controller 110 may include configurable circuitry capable of performing one or more facial recognition techniques. Such facial recognition techniques may include any current or future developed facial recognition techniques. Such facial recognition techniques may include, but are not limited to: feature-based techniques (e.g., statistical graphing, deformable template matching, elastic bunch graphing matching, and similar techniques that use geometric relationships between facial features); statistical holistic techniques that represent facial structure as a 2-dimensional array of intensity values; Principal Component Analysis (PCA); and Linear Discriminant Analysis (LDA). Combinations and variations on each of the above analyses are also possible and should be considered within the scope of this disclosure.

In some implementations, the facial recognition controller 110 may include one or more threads executing on a multi-core processor platform. In some implementations, the facial recognition controller 110 may include one or more hard-wired devices capable of executing machine-readable instruction sets. In some implementations, the facial recognition controller 110 may be implemented in the form of one or more field programmable gate arrays (FPGAs), programmable gate arrays (PGAs), reduced instruction set computers (RISCs), application specific integrated circuit (ASIC), systems on a chip (SoCs), or similar.

In some implementations, the facial recognition controller 110 may include one or more storage devices, for example one or more solid state storage devices used to store or otherwise retain a basic input/output system (BIOS), operating system (0/S), and/or machine-readable instruction sets that cause circuitry to provide and function as the facial recognition controller 110. In some implementations the facial recognition controller 110 may include cache memory.

The communications interface 112 may include one or more wired or wireless communications interfaces capable of exchanging data, commands, and/or information with one or more remote devices. In some implementations, the communications interface 112 may communicably couple the facial recognition controller 110 to the storage device 114 that stores or otherwise retains some or all of the number of historical images 116.

Figure 2:
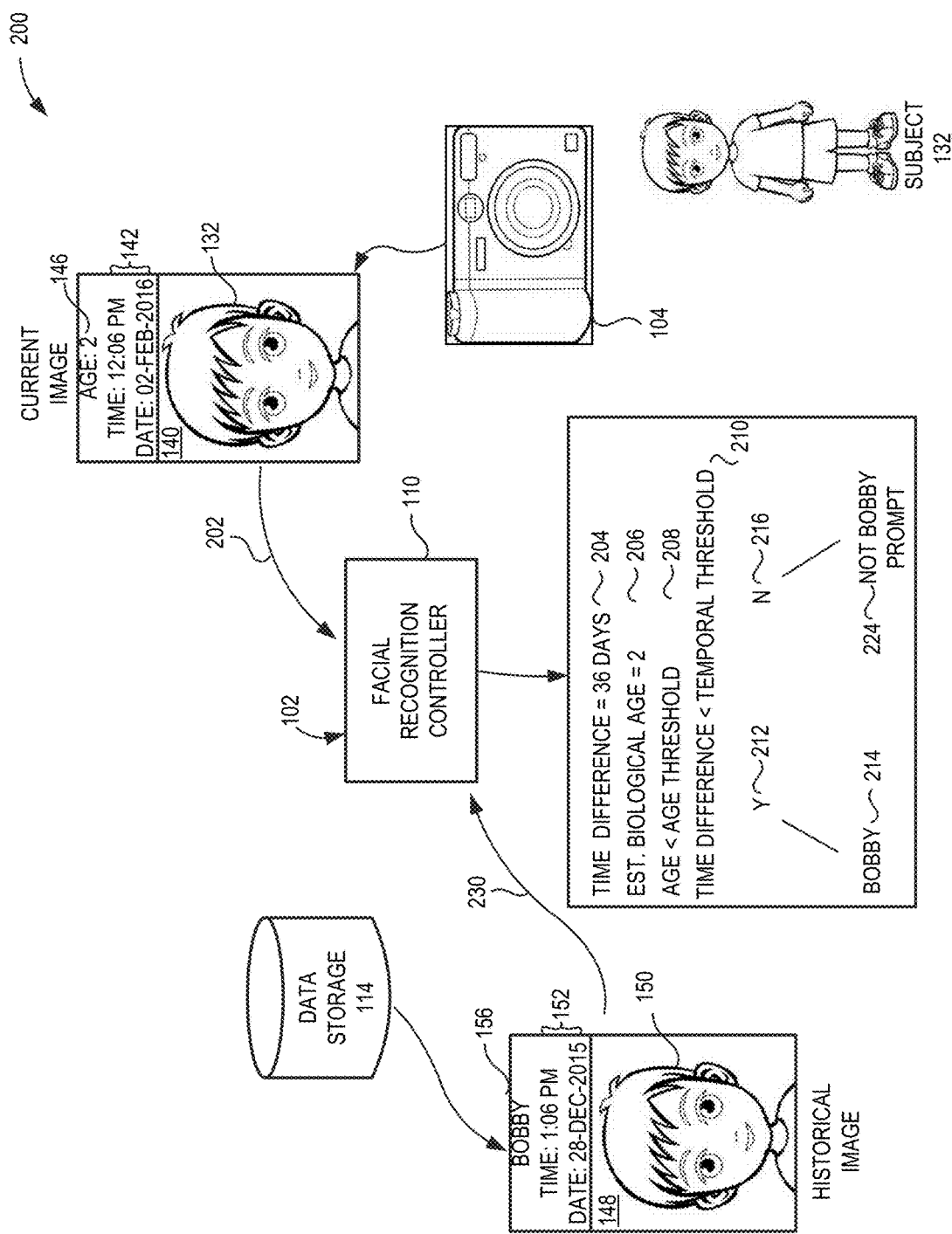
FIG. 2 a schematic diagram of an illustrative facial recognition system in use with a camera and a remote, processor-based, facial recognition system, in accordance with at least one embodiment of the present disclosure.

FIG. 2 depicts an illustrative facial recognition system 200 in use with a portable electronic device 102 such as a camera and a remote, processor-based, facial recognition controller 110, in accordance with at least one embodiment of the present disclosure. In some implementations, such as that depicted in FIG. 2, the image acquisition device 104 may be disposed remote from the portable electronic device 102. In at least some implementations, the image acquisition device 104 may include all or a portion of the biological age estimator circuitry 108 and/or all or a portion of the facial recognition controller 110. In embodiments, as depicted in FIG. 2, the image acquisition device 104 communicates 202 data or information to the facial recognition controller 110—the data or information so communicated may include data representative of a current image 140 containing a subject 132, an estimated biological age of the subject 146 and a date/time of acquisition 142 of the image.

The facial recognition controller 110 receives data from the image acquisition device 104. In some implementations, the facial recognition controller 110 may receive the data from the image acquisition device 104 immediately subsequent to the acquisition of the image data by the image acquisition device 104. In some implementations, the facial recognition controller 110 may receive data from the image acquisition device 104 periodically or intermittently subsequent to the acquisition of the image data by the image acquisition device 104.

The facial recognition controller 110 may identify the subject 132 included in the received current image data 140 using one or more facial recognition techniques. In some implementations the facial recognition controller 110 may retrieve any number of historical images 116 from one or more local and/or remote data storage devices 114. The facial recognition controller 110 may determine a subject 150 appearing in a selected historical image 148 may provide sufficient facial structure similarity to the subject 132 in the current image 140. In such an instance, the facial recognition controller 110 may retrieve 230 some or all of the data representative of the historical image 148. In some implementations, the data retrieved 230 from the data storage device 114 may include data indicative of a subject identifier 156 logically associated with the subject 150 appearing in the selected historical image 148 and may include data representative of the date/time of acquisition 152 logically associated with the selected historical image 148.

In embodiments, the facial recognition controller 110 may determine a temporal difference 204 between the acquisition date/time 142 of the current image 140 and the acquisition date/time 152 of the historical image 148. The facial recognition controller 110 may then determine whether the estimated biological age 206 of the subject 132 in the current image 132 is less than a defined age threshold value. In at least some implementations, the age threshold value used by the facial recognition controller 110 may be indicative of an age of a child, for example 1 year of age; 2 years of age; 3 years of age; 5 years of age; 7 years of age; 10 years of age; or 13 years of age. The facial recognition controller 110 may then determine an appropriate temporal difference threshold. In some implementations, the temporal difference threshold may be determined based at least in part on the estimated biological age 146 of the subject 132 included in the current image 140. In some implementations, the temporal difference threshold may include a fixed value, such as 30 days; 60 days; 90 days; 180 days; 270 days; or 365 days.

Based at least in part on the biological age of the subject 132 in the current image 140, the facial recognition controller 110 may then determine whether the temporal difference between the acquisition time/date 142 of the current image 140 and the acquisition time/date 152 of the selected historical image 148 is less than the determined temporal threshold (i.e., were the current image 140 and the selected historical image 148 taken within a temporal window less than the determined temporal threshold). If the temporal difference between the acquisition time/date 142 of the current image 140 and the acquisition time/date 152 of the selected historical image 148 is less or equal to the determined temporal threshold, the facial recognition controller 110 concludes the subject 132 in the current image 140 is the same as the subject 150 included in the selected historical image 148. In such an instance, the facial recognition controller 110 may logically associate the subject identifier 156 from the selected historical image 148 with the subject 132 in the current image 140. If, on the other hand, the temporal difference between the acquisition time/date 142 of the current image 140 and the acquisition time/date 152 of the selected historical image 148 is greater than the determined temporal threshold, the facial recognition controller 110 concludes the subject 132 in the current image 140 is NOT the same as the subject 150 included in the selected historical image 148 and prompts the portable electronic device user to provide a new identifier for logical association with the subject 132 in the current image 140.

Figure 3:
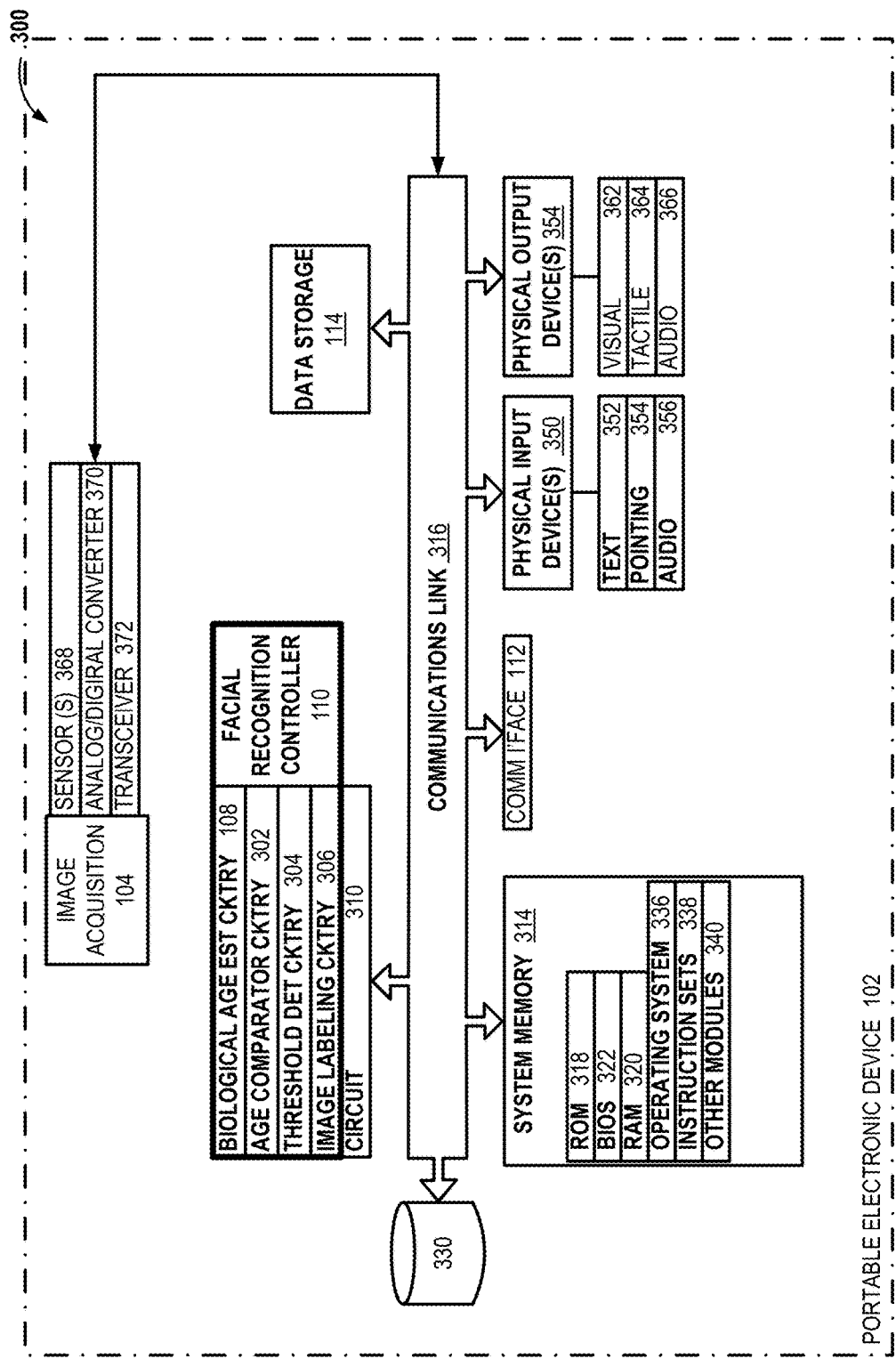
FIG. 3 is a block diagram of an illustrative processor-based device in which the facial recognition system may be implemented, in accordance with at least one embodiment of the present disclosure.

FIG. 3 and the following discussion provide a brief, general description of the components forming an illustrative system 300 that includes one or more facial recognition controllers 110 in which the various illustrated embodiments of the facial recognition system 100 may be implemented. Although not required, some portion of the embodiments will be described in the general context of machine-readable or computer-executable instruction sets, such as program application modules, objects, or macros being executed by the one or more facial recognition controllers 110. As depicted in FIG. 3, the facial recognition controller 110 may include various circuits or circuitry, such as some or all of: the biological age estimation circuitry 108, age comparator circuitry 302; temporal threshold determination circuitry 304; and image labeling circuitry 306. Such circuitry may be implemented in the form of hardwired circuits, programmable circuits, controllers, signal processors, processors, microprocessors, or combinations thereof.

Those skilled in the relevant art will appreciate that the illustrated embodiments as well as other embodiments can be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The portable electronic device 102 may include any number of circuits 310, each of which may include a variety of electronic and/or semiconductor components that are disposed partially or wholly in a wearable computer, portable computing device, personal digital assistant, personal computer, or other similar current or future processor-based devices and/or systems capable of executing machine-readable instructions. The number of circuits 310 may be interconnected with, electrically coupled, and/or communicably coupled to various components within the portable electronic device 102 via one or more communications links 316. As depicted in FIG. 3, system components such as a system memory 314 may be communicably coupled to each of the number of circuits 310 via the one or more communications links 316. The portable electronic device 102 may, at times, be referred to in the singular herein, but this is not intended to limit the embodiments to a single system, since in certain embodiments, there will be more than one portable electronic device 102 or other networked systems, circuits, or devices involved.

Each of the number of circuits 310 may include any number, type, or combination of conductors, insulators, electrical devices, and/or semiconductor components. At times, each of the number of circuits 310, including all or a portion of the facial recognition controller 110, may be implemented in whole or in part in the form of semiconductor devices such as diodes, transistors, inductors, capacitors, and resistors. Such an implementation may include, but is not limited to any current or future developed single- or multi-core processor or microprocessor, such as: one or more systems on a chip (SOCs); one or more central processing units (CPUs); one or more digital signal processors (DSPs); one or more graphics processing units (GPUs); one or more application-specific integrated circuits (ASICs), one or more field programmable gate arrays (FPGAs), and the like. Unless described otherwise, the construction and operation of the various blocks shown in FIG. 3 are of conventional design. As a result, such blocks need not be described in further detail herein, as they will be understood by those skilled in the relevant art. The one or more communications links 316 that interconnects at least some of the components may employ any known serial or parallel bus structures or architectures.

The system memory 314 may include read-only memory ("ROM") 318 and random access memory ("RAM") 320. A portion of the ROM 318 may contain a basic input/output system ("BIOS") 322. The BIOS 322 may provide basic functionality to the portable electronic device 122, for example by causing at least some of the number of circuits 310 to load one or more machine-readable instruction sets that cause at least one of the number of circuits 310 to provide and function as a particular and facial recognition controller 110. The portable electronic device 102 may include one or more communicably coupled, non-transitory, data storage devices 114. The one or more data storage devices 114 may include any number and/or combination of any current or future developed non-transitory storage devices. Non-limiting examples of such non-transitory, data storage devices 114 may include, but are not limited to one or more magnetic storage devices, one or more optical storage devices, one or more solid-state electromagnetic storage devices, one or more electroresistive storage devices, one or more molecular storage devices, one or more quantum storage devices, or various combinations thereof.

The one or more storage devices 114 may include interfaces or controllers (not shown) communicatively coupling the respective storage device(s) 114 to the one or more communications links 316, as is known by those skilled in the art. The one or more storage devices 114 may store, retain, or otherwise include a number of machine-readable instruction sets, data structures, program modules, and other data useful to the portable electronic device 102. In some instances, one or more external storage devices 330 may be communicably coupled to the portable electronic device 102. In one example, the one or more external storage devices 330 may include one or more remote server based storage devices or "cloud" storage devices that are bidirectionally communicably coupled to the portable electronic device 102 via one or more networks 120, such as one or more wireless networks (e.g., IEEE 802.11 "Wi-Fi"), one or more wired networks (e.g., IEEE 802.3 "Ethernet"), or combinations thereof.

The portable electronic device 102 may include a number of image acquisition devices 104 that may be unidirectionally or bidirectionally communicably coupled to the facial recognition controller 110 via the one or more communications links 316. In some implementations, each of the number of image acquisition devices 104 may include one or more current or future developed image sensors 368 (e.g., one or more charge coupled device (CCD) or complementary metal oxide semiconductor (CMOS) image sensors, or similar). In at least some implementations, such image sensors 368 may autonomously collect environmental data or information. In embodiments, each of the image acquisition devices 104 may include one or more analog-to-digital and/or digital-to-analog converters 370, and one or more transceivers 372.

Machine-readable instruction sets and/or applications 338 and housekeeping instruction sets 340 may be stored or otherwise retained in whole or in part in the system memory 314. Such instruction sets may be transferred from one or more storage devices 114 and/or one or more external storage devices 330 and stored in the system memory 314 in whole or in part for execution by at least one of the number of circuits 310. The machine-readable instruction sets 338 may include instructions and/or logic that provide the biological age estimator circuitry 108 and facial recognition controller 110 as described herein.

For example, one or more machine-readable instruction sets 338 may cause the biological age estimator circuitry 108 to autonomously determine an estimated biological age 146 of a subject 132 included in the current image 140. The one or more machine-readable instruction sets 338 may cause the image labeling circuitry 306 to autonomously determine an identity of at least one subject 132 in the current image 140 using one or more facial recognition techniques. The one or more machine-readable instruction sets 338 may cause the image labeling circuitry 306 to compare the estimated biological age 146 of the subject 132 in the current image 140 with a defined age threshold determined by the temporal threshold determination circuitry 304. The one or more machine-readable instruction sets 338 may cause the age comparator circuitry 302 to determine a temporal difference between the acquisition time/date 142 of the current image 140 with the acquisition time/date 152 of a historical image 148 that includes a historical image in which the subject 150 has been accurately identified. (As used herein, an "accurately identified" subject refers to a subject identification that has been at least one of: confirmed by a system user or viewed by a system user and NOT corrected by the system user).

In embodiments, the one or more machine-readable instruction sets 338 may cause the temporal threshold determination circuitry 304 to calculate one or more temporal threshold values. In embodiments, the one or more machine-readable instruction sets 338 may cause the temporal threshold determination circuitry 304 to determine a temporal threshold based at least in part on the estimated biological age of the subject 132 in the current image 140. The one or more machine-readable instruction sets 338 may cause the age comparator circuitry 302 to compare the temporal difference between the acquisition time/date 142 of the current image 140 with the acquisition time/date 152 of a historical image 148 with the defined temporal threshold provided by the temporal threshold determination circuitry 304.

The portable electronic device 102 may include one or more communicably coupled physical input devices 350, such as one or more text entry devices 352 (e.g., keyboard), one or more pointing devices 354 (e.g., mouse, trackball, touchscreen), and/or one or more audio input devices 356. Such physical input devices 350 may be used, for example, to provide, enter, or otherwise supply commands (e.g., acknowledgements, selections, confirmations, and similar) as well as information (e.g., acknowledgements, corrected subject identifiers, and similar) to the facial recognition controller 110.

The portable electronic device 102 may include one or more communicably coupled physical output devices 360, such as one or more visual output devices 362 (e.g., a display device), one or more tactile output devices 364 (e.g., haptic feedback or similar), one or more audio output devices 366, or any combination thereof.

For convenience, the communication interface 112, the number of circuits 310, the system memory 314, the physical input devices 350 and the physical output devices 360 are illustrated as communicatively coupled to each other via the one or more communications links 316, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In some embodiments, the one or more communications links 316 may be omitted and the components are coupled directly to each other using suitable wired or wireless connections.

Figure 4:
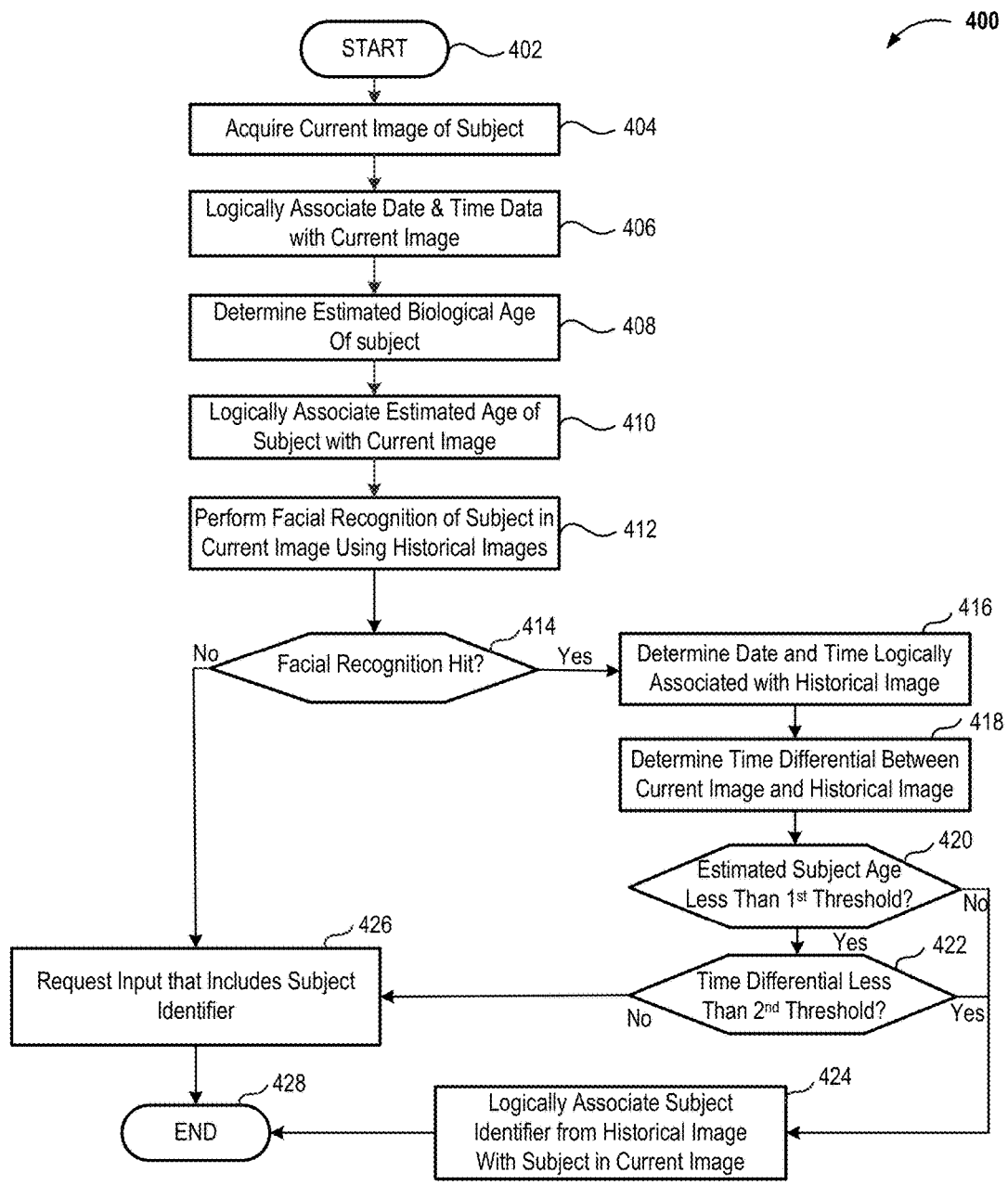
FIG. 4 provides a high-level flow diagram of an illustrative facial recognition method, in accordance with at least one embodiment of the present disclosure.

FIG. 4 provides a high-level flow diagram of an illustrative facial recognition method 400, in accordance with at least one embodiment of the present disclosure. The method 400 commences at 402.

At 404, an image acquisition device 104 acquires or otherwise captures a current image 140 of a subject 132. In some implementations, the image acquisition device 104 may be disposed in a portable electronic device 102 such as any current or future developed smartphone, wearable computer, ultraportable computer, or handheld computer. In other implementations, the image acquisition device 104 may be disposed in a portable electronic device 102 such as any current or future developed portable camera, a point-and-shoot camera, a disposable camera, or similar. In some implementations, the current image 140 may have any format, size, shape, or configuration. Example formats for the current image 140 may include, but are not limited to, JPEG, GIF, RAW, TIFF, BMP, or PNG. Example image sizes for the current image 140 may include, but is not limited to, 1 megapixel or less; 1 megapixel or less; 2 megapixel or less; 5 megapixel or less; 10 megapixel or less; 20 megapixel or less; 30 megapixel or less; 40 megapixel or less; 50 megapixel or less; 100 megapixel or less.

At 406, a date/time of acquisition 146 of the current image 140 may be logically associated with the current image 140. In some implementations, the image acquisition device 104 may receive data indicative of a date and a time of acquisition of the current image 140. In some implementations, the date data and/or the time data may be provided by one or more clocking or timing systems or components present in the image acquisition device 104. In other implementations, the date data and/or the time data may be provided by one or more clocking or timing systems or components present in a device, such as a cloud-based or remote server, that is positioned external, but communicably coupled to the image acquisition device 104. In some implementations, the time/date data 146 may be logically associated using a frame, metadata, or other logical structure that is logically associated with or stored as a portion of the current image 140.

At 408, the biological age estimator circuitry 108 performs a biological age estimation technique on the subject 132 included in the current image 140. In some implementations, any current or future developed facial recognition technique or techniques.

At 410, data representative of the estimated biological age 142 determined by the biological age estimator circuitry 108 may be logically associated with the current image 140. In some implementations, the biological age estimator circuitry 108 may logically associate the data representative of the estimated biological age 142 with the current image 140. In some implementation the image labeling circuitry 306 may logically associate the data representative of the estimated biological age 142 with the current image 140.

At 412, in embodiments, image labeling circuitry 306 may perform a facial recognition technique on the subject 132 included in the current image 140. In some implementations, any current or future developed facial recognition technique or techniques. In at least some implementations, the image labeling circuitry 306 may perform a facial recognition technique using a number of stored historical images 116.

At 414, the image labeling circuitry 306 determines whether a facial recognition "hit" occurred at 412. If the image labeling circuitry 306 determines a facial recognition "hit" does occur at 414, the method 400 continues at 416. On the other hand, if the image labeling circuitry 306 determines a facial recognition "hit" did not occur at 414, at 426 the image labeling circuitry 306 may request the portable electronic device user provide an identifier for logical association with the subject 132 in the current image 140 and concludes the method 400 at 428.

At 416, the age comparator circuitry 302 may determine the acquisition date/time 152 of the historical image 148 that includes the historical data representative of the subject 150. In some implementations, such acquisition time/date information may be included in a frame, metadata, or similar logical structure logically associated with the identified historical image 148.

At 418, the age comparator circuitry 302 may determine a temporal difference between the acquisition date/time 146 of the current image 140 and the acquisition date/time 152 of the identified historical image 148.

At 420, the age comparator circuitry 302 may determine whether the estimated biological age 146 of the subject 132 included in the current image 140 is less than or equal to a defined age threshold. In some implementations, the age threshold may be set at a value corresponding to a defined child's age. For example, the age threshold value may be set at 3 months of age or less; 6 months of age or less; 1 year of age or less; 18 months of age or less; 2 years of age or less; 3 years of age or less; 5 years of age or less; 10 years of age or less; or 13 years of age or less. If the estimated biological age of the subject 132 in the current image 140 is less than or equal to the age threshold (e.g., the subject 132 is a "child"), the method 400 continues at 422.

If the estimated biological age of the subject 132 in the current image 140 is greater than the age threshold (e.g., the subject 132 is an "adult"), at 424 the image labeling circuitry 306 logically associates the subject identifier 156 logically associated with the identified historical image 148 with the current image 140 and concludes the method at 428.

At 422, subsequent to determining the estimated biological age 146 of the subject 132 in the current image 140 is equal to or less than the age threshold, the age comparator circuitry 302 determines whether the temporal difference between the acquisition date/time 142 of the current image 140 and the acquisition date/time 152 of the identified historical image 148 is less than or equal to a defined temporal threshold.

If the temporal difference between the acquisition date/time 142 of the current image 140 and the acquisition date/time 152 of the identified historical image 148 is less than or equal to a defined temporal threshold (e.g., the subject 132 is a "child" and the time between the current image 140 and the identified historical image 148 is shorter than the temporal threshold) at 424 the image labeling circuitry 306 logically associates the subject identifier 156 logically associated with the identified historical image 148 with the current image 140 and concludes the method at 428.

If the temporal difference between the acquisition date/time 142 of the current image 140 and the acquisition date/time 152 of the identified historical image 148 is greater than the defined temporal threshold (e.g., the subject 132 is a "child" and the time between the current image 140 and the identified historical image 148 is greater than the temporal threshold), at 426 the image labeling circuitry 306 may request the portable electronic device user provide a subject identifier for logical association with the current image 140 (e.g., the subject 132 in the current image 140 is a "new child" and NOT the "child" in the identified historical image) and concludes the method 400 at 428.

Figure 5:
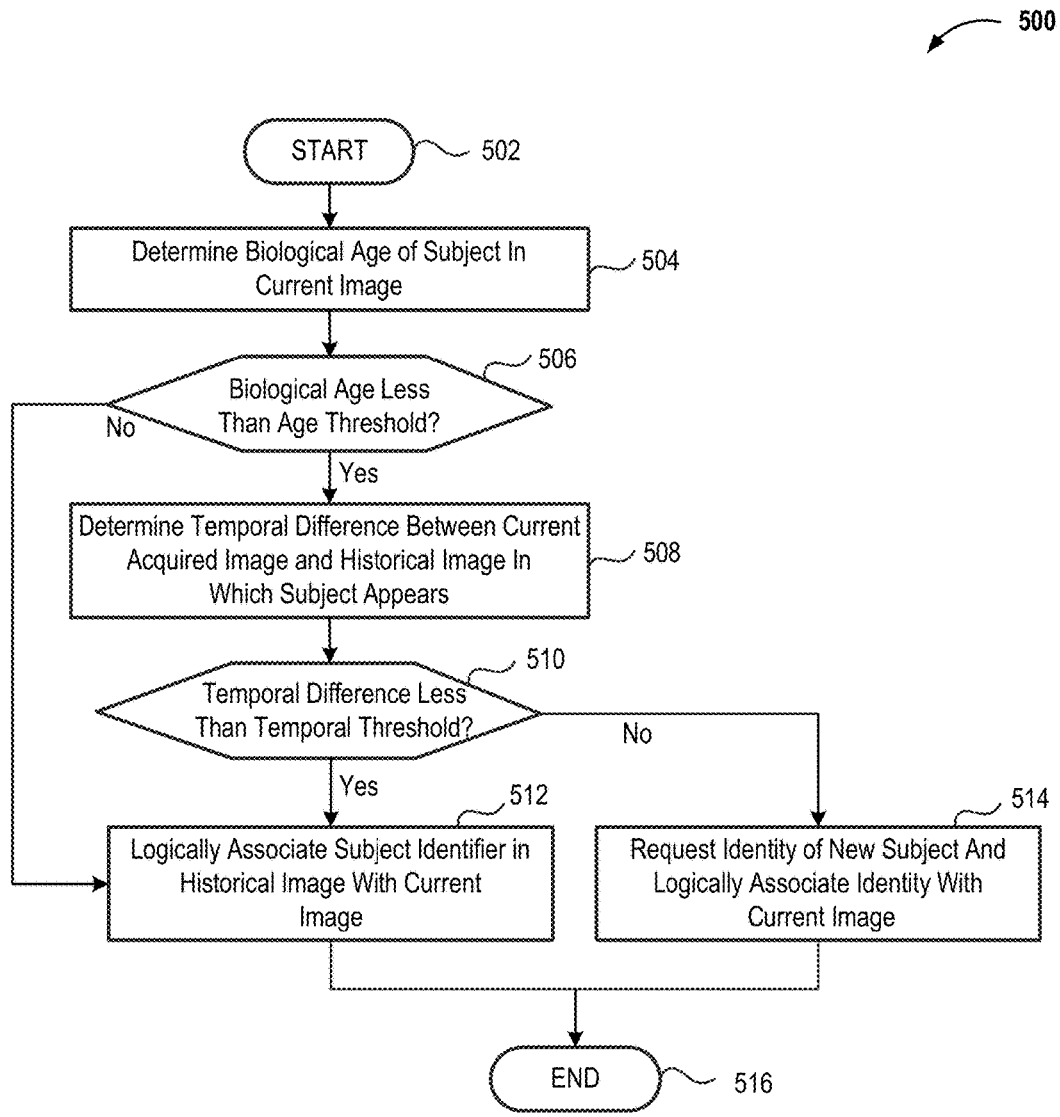
FIG. 5 provides a high-level flow diagram of another illustrative facial recognition method, in accordance with at least one embodiment of the present disclosure.

FIG. 5 provides a high-level flow diagram of another illustrative facial recognition method 500 subsequent to the facial recognition controller 110 identifying a historical image 116 that includes a subject 150 matching the subject 132 in the current image 140, in accordance with at least one embodiment of the present disclosure. The method 500 commences at 502.

At 504, the biological age estimator circuitry 108 performs a biological age estimation technique on the subject 132 included in the current image 140. In some implementations, any current or future developed facial recognition technique or techniques. In embodiments, data representative of the estimated biological age 146 determined by the biological age estimator circuitry 108 may be logically associated with the current image 140.

At 506, the facial recognition controller 110 determines whether the estimated biological age of the subject 132 is less than or equal to a defined age threshold. In some implementations, the defined age threshold may correspond to an age defining various stages of childhood. Examples of such ages defining various stages of childhood include, but are not limited to: an age defining an infant; an age defining a toddler, an age defining an adolescent; or an age defining a teenager. In some implementations, the defined age threshold may correspond to an age defining various stages of adulthood. Examples of such ages defining various stages of adulthood include, but are not limited to: an age defining a young adult, an age defining a middle aged adult, or an age defining an elderly adult.

If, at 506, the facial recognition controller 110 determines the estimated biological age of the subject 132 in the current image 140 is less than or equal to the defined age threshold, the method 500 continues at 508. If, at 506, the facial recognition controller 110 determines the estimated biological age of the subject 132 in the current image 140 is greater than the defined age threshold, the facial recognition controller 110 may logically associate the subject identifier 156 logically associated with the identified historical image 148 with the current image 140 and conclude the method 500 at 516.

At 508, the facial recognition controller 110 may determine a temporal difference between the acquisition date/time 146 of the current image 140 and the acquisition date/time 152 of the identified historical image 148.

At 510, the facial recognition controller 110 determines whether the temporal difference between the acquisition date/time 142 of the current image 140 and the acquisition date/time 152 of the identified historical image 148 is less than or equal to a defined temporal threshold.

If the temporal difference between the acquisition date/time 142 of the current image 140 and the acquisition date/time 152 of the identified historical image 148 is less than or equal to a defined temporal threshold, at 512 the facial recognition controller 110 logically associates the subject identifier 156 logically associated with the identified historical image 148 with the current image 140 and concludes the method 500 at 516.

If the temporal difference between the acquisition date/time 142 of the current image 140 and the acquisition date/time 152 of the identified historical image 148 is greater than the defined temporal threshold, at 514 the facial recognition controller 110 may request the portable electronic device user provide an identifier for logical association with the current image 140 and concludes the method 500 at 516.

Figure 6:
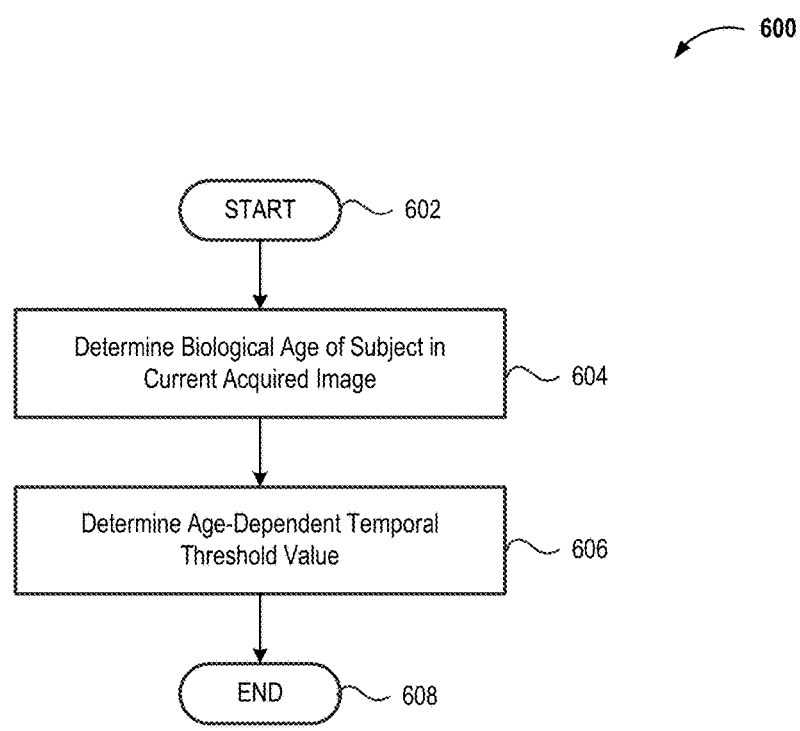
FIG. 6 provides a high-level flow diagram of an illustrative temporal threshold determination method that incorporates an estimated biological age of a subject appearing in a current image and which may be implemented in conjunction with the methods described in FIGS. 4 and 5, in accordance with at least one embodiment of the present disclosure.

FIG. 6 provides a high-level flow diagram of an illustrative temporal threshold determination method 600 that incorporates an estimated biological age 146 of the subject 132 appearing in a current image 140 and which may be implemented in conjunction with the methods 400 and 500 described in FIGS. 4 and 5, in accordance with at least one embodiment of the present disclosure. The method 600 commences at 602.

At 604, the biological age estimator circuitry 108 performs a biological age estimation technique on the subject 132 included in the current image 140. In some implementations, any current or future developed facial recognition technique or techniques. In embodiments, data representative of the estimated biological age 146 determined by the biological age estimator circuitry 108 may be logically associated with the current image 140.

At 606, the facial recognition controller 110 determines an estimated biological age-dependent temporal threshold based at least in part on the estimated biological age 146 of the subject 132 in the current image 140. In at least some implementations, the estimated biological age-dependent temporal threshold may vary in proportion to the estimated biological age such that the estimated biological age-dependent temporal threshold is smaller or shorter (e.g., 30 days) for younger estimated biological ages (e.g., estimated biological ages less than 12 months) and greater or longer (e.g., 365 days) for older estimated biological ages (e.g., estimated biological ages greater than 18 years of age). Such an age-dependent temporal threshold advantageously accommodates the relatively rapid changes in facial structure at younger ages and the relatively stagnant changes in facial structure at older ages. The method 600 concludes at 608.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for autonomously performing a facial recognition method that includes determining an estimated biological age of a subject in a current image. The method further includes performing one or more facial recognition techniques on the current image, at least one of the techniques including locating a historical image that includes the subject. A temporal difference between the current image and the historical image may be determined by finding a difference between an acquisition time logically associated with the current image and an acquisition time logically associated with the historical image. The estimated biological age and the temporal difference may be used to improve the accuracy of the facial recognition system.

According to example 1, there is provided a facial recognition system. The facial recognition system may include: an image sensor; biological age estimator circuitry coupled to the image sensor, the biological age estimator circuitry to determine whether an estimated biological age of a subject in a current image acquired by the image sensor is less than a defined age threshold; age comparator circuitry coupled to the image sensor, a data storage device, and the biological age estimator circuitry, the age comparator circuitry to determine whether a temporal difference between an acquisition time logically associated with the current image and an acquisition time logically associated with a historical image that includes the subject and a logically associated subject identifier is less than a defined temporal threshold; and image labeling circuitry coupled to the image sensor, the age comparator circuitry, and the biological age estimator circuitry, the image labeling circuitry to logically associate the subject identifier with the current image responsive to determining the estimated biological age of the subject is less than the defined age threshold and the temporal difference is less than the temporal threshold.

Example 2 may include elements of example 1 and the biological age estimator circuitry may further: receive a signal from the image sensor, the signal including data or information representative of the current image that includes the subject; and determine the estimated biological age of the subject included in the signal received from the image sensor.

Example 3 may include elements of example 2, and the biological age estimator circuitry may further determine whether the subject is an infant by determining whether the estimated biological age of a subject in the image acquired by the image sensor is less than a first defined age threshold equal to 12 months.

Example 4 may include elements of example 2, and may additionally include temporal threshold determination circuitry coupled to the age comparator circuitry, the temporal threshold determination circuitry to: determine an age-dependent temporal threshold based at least in part on the estimated biological age of the subject included in the signal received from the image sensor; and determine whether the temporal difference between the acquisition time of the current image and the acquisition time of the historical image is less than the determined age-dependent temporal threshold.

Example 5 may include elements of example 2, and may additionally include temporal threshold determination circuitry coupled to the age comparator circuitry, the temporal threshold determination circuitry to: select an age-dependent temporal threshold based on the estimated biological age of the subject included in the signal received from the image sensor; and determine whether the temporal difference between the acquisition time of the current image and the acquisition time of the historical image is less than the selected age-dependent temporal threshold.

Example 6 may include elements of example 1 and the image labeling circuitry may further: logically associate the subject identifier with the current image responsive to determining the estimated age of the subject is greater than the defined age threshold and the temporal difference is less than the temporal threshold.

Example 7 may include elements of example 1 and the image labeling circuitry may further solicit user input that includes at least a new subject identifier responsive to determining the estimated age of the subject is less than the defined age threshold and the temporal difference is greater than the temporal threshold; and logically associate the new subject identifier with the current image.

Example 8 may include elements of example 1 and the image labeling circuitry may further: solicit user input that includes at least a new subject identifier responsive to failing to locate a historical image that includes the subject; and logically associate the new subject identifier with the current image.

According to example 9, there is provided a facial recognition controller. The facial recognition controller may include biological age estimator circuitry coupled to an image sensor, the biological age estimator circuitry to determine whether an estimated biological age of a subject in a current image acquired by the image sensor is less than a defined age threshold; age comparator circuitry coupled to the image sensor, a data storage device, and the biological age estimator circuitry, the age comparator circuitry to determine whether a temporal difference between an acquisition time logically associated with the current image and an acquisition time logically associated with a historical image that includes the subject and a logically associated subject identifier is less than a defined temporal threshold; and image labeling circuitry coupled to the image sensor, the age comparator circuitry, and the biological age estimator circuitry, the image labeling circuitry to logically associate the subject identifier with the current image responsive to determining the estimated biological age of the subject is less than the defined age threshold and the temporal difference is less than the temporal threshold.

Example 10 may include elements of example 9 and the biological age estimator circuitry may further: receive a signal from the image sensor, the signal including data or information representative of the current image that includes the subject; and determine the estimated biological age of the subject included in the signal received from the image sensor.

Example 11 may include elements of example 10 and the biological age estimator circuitry may further determine whether the subject is an infant by determining whether the estimated biological age of a subject in the current image is less than a first defined age threshold equal to 12 months.

Example 12 may include elements of example 10, and may additionally include temporal threshold determination circuitry coupled to the age comparator circuitry, the temporal threshold determination circuitry to: determine an age-dependent temporal threshold based at least in part on the estimated biological age of the subject included in the current image.

Example 13 may include elements of example 10, and may additionally include temporal threshold determination circuitry coupled to the age comparator circuitry, the temporal threshold determination circuitry to: select an age-dependent temporal threshold based, at least in part, on the estimated biological age of the subject included in the current image.

Example 14 may include elements of example 9 and the image labeling circuitry may further: logically associate the subject identifier with the current image responsive to determining the estimated age of the subject is greater than the defined age threshold and the temporal difference is less than the temporal threshold.

Example 15 may include elements of example 10 and the image labeling circuitry may further solicit user input that includes at least a new subject identifier responsive to determining the estimated age of the subject is less than the defined age threshold and the temporal difference is greater than the temporal threshold; and logically associate the new subject identifier with the current image.

Example 16 may include elements of example 9 and the image labeling circuitry may further: solicit user input that includes at least a new subject identifier responsive to failing to locate a historical image that includes the subject; and logically associate the new subject identifier with the current image.

According to example 17, there is provided an image classification method. The method may include determining, by biological age estimator circuitry, whether an estimated biological age of a subject in a current image acquired by an image sensor communicably coupled to the facial recognition state machine is less than a defined age threshold; determining, by age comparator circuitry coupled to the biological age estimator circuitry, whether a temporal difference between an acquisition time logically associated with the current image and an acquisition time logically associated with a historical image stored on a communicably coupled storage device is less than a defined temporal threshold, the historical image including the subject and a logically associated subject identifier; and logically associating, by image labeling circuitry coupled to the biological age estimator circuitry and the age comparator circuitry, the subject identifier with the current image responsive to determining the estimated age of the subject is less than the defined age threshold and the temporal difference is less than the temporal threshold.

Example 18 may include elements of example 17 where determining whether an estimated biological age of a subject in a current image is less than a defined age threshold comprises: receiving a signal from the image sensor by the biological age estimator circuitry, the signal including data or information representative of the current image that includes the subject; and determining, by the biological age estimator circuitry, the estimated biological age of the subject included in the current image.

Example 19 may include elements of example 18 where determining whether an estimated biological age of a subject in a current image is less than a defined age threshold comprises: determining, by the biological age estimator circuitry, whether the subject is an infant by determining whether the estimated biological age of a subject in the current image is less than a first defined age threshold equal to 12 months.

Example 20 may include elements of example 18 where determining whether a temporal difference between an acquisition time logically associated with the current image and an acquisition time logically associated with a historical image stored on a communicably coupled storage device is less than a defined temporal threshold, the historical image including the subject and a logically associated subject identifier may include determining, by temporal threshold determination circuitry, an age-dependent temporal threshold based at least in part on the estimated biological age of the subject included in the current image.

Example 21 may include elements of example 18 where determining whether a temporal difference between an acquisition time logically associated with the current image and an acquisition time logically associated with a historical image may include selecting, by temporal threshold determination circuitry, an age-dependent temporal threshold based on the estimated biological age of the subject included in the current image.

Example 22 may include elements of example 17, and may additionally include logically associating, by the image labeling circuitry, the subject identifier with the current image responsive to determining the estimated age of the subject is greater than the defined age threshold and the temporal difference is less than the temporal threshold.

Example 23 may include elements of example 17, and may additionally include soliciting, by the image labeling circuitry, user input that includes at least a new subject identifier responsive to determining the estimated age of the subject is less than the defined age threshold and the temporal difference is greater than the temporal threshold; and logically associating, by the image labeling circuitry, the new subject identifier with the subject in the current image.

Example 24 may include elements of example 17, and may additionally include soliciting, by the image labeling circuitry, user input that includes at least a new subject identifier responsive to failing to locate a historical image that includes the subject; and logically associating, by the image labeling circuitry, the new subject identifier with the current image.

According to example 25, there is provided a storage device that includes machine-readable instructions that, when executed by a circuit, cause the circuit to provide a facial recognition controller. In operation, the facial recognition controller causes biological age estimator circuitry to determine whether an estimated biological age of a subject in a current image acquired by a communicably coupled image sensor is less than a defined age threshold; causes age comparator circuitry coupled to the biological age estimator circuitry to determine whether a temporal difference between an acquisition time logically associated with the current image and an acquisition time logically associated with a historical image that includes the subject and a logically associated subject identifier is less than a defined temporal threshold; and causes image labeling circuitry coupled to the biological age estimator circuitry and to the age comparator circuitry to logically associate the subject identifier with the current image responsive to determining the estimated biological age of the subject is less than the defined age threshold and the temporal difference is less than the temporal threshold.

Example 26 may include elements of example 25 where the machine-readable instructions that cause the facial recognition controller to determine whether an estimated biological age of a subject in an image acquired by the image sensor is less than a defined age threshold, may further cause the facial recognition controller to: cause the biological age estimator circuitry to receive a signal from the image sensor, the signal including data or information representative of an image that includes the subject; and cause the biological age estimator circuitry to determine the estimated biological age of the subject included in the signal received from the image sensor.

Example 27 may include elements of example 26 where the machine-readable instructions that cause the facial recognition controller to determine whether an estimated biological age of a subject in an image acquired by the image sensor is less than a defined age threshold, may further cause the facial recognition controller to cause the biological age estimator circuitry to determine whether the subject is an infant by determining whether the estimated biological age of a subject in the image acquired by the image sensor is less than a first defined age threshold equal to 12 months.

Example 28 may include elements of example 26 where the machine-readable instructions that cause the facial recognition controller to determine whether a temporal difference between a first acquisition time logically associated with the image and a second acquisition time logically associated with a historical image that includes the subject and a first identifier logically associated with the subject is less than a defined temporal threshold, may further cause the facial recognition controller to cause the threshold determination circuitry to determine an age-dependent temporal threshold based at least in part on the estimated biological age of the subject included in the signal received from the image sensor.

Example 29 may include elements of example 26 where the machine-readable instructions that cause the facial recognition controller to determine whether a temporal difference between a first acquisition time logically associated with the image and a second acquisition time logically associated with a historical image that includes the subject and a first identifier logically associated with the subject is less than a defined temporal threshold, may further cause the facial recognition controller to cause the threshold determination circuitry to select an age-dependent temporal threshold based on the estimated biological age of the subject included in the signal received from the image sensor.

Example 30 may include elements of example 25 where the machine-readable instructions may further cause the facial recognition controller to cause the image labeling circuitry to logically associate the first identifier with the subject responsive to determining the estimated age of the subject is greater than the defined age threshold and the temporal difference is less than the temporal threshold.

Example 31 may include elements of example 25 where the machine-readable instructions may further cause the facial recognition controller to cause the image labeling circuitry to solicit user input that includes at least a third identifier responsive to determining the estimated age of the subject is less than the defined age threshold and the temporal difference is greater than the temporal threshold; and cause the image labeling circuitry to logically associate the third identifier with the acquired image.

Example 32 may include elements of example 25 where the machine-readable instructions may further cause the facial recognition controller to cause the image labeling circuitry to solicit user input that includes at least a fourth identifier responsive to failing to locate a historical image that includes the subject; and cause the image labeling circuitry to logically associate the fourth identifier with the acquired image.

According to example 33, there is provided an image classification system. The system may include a means for determining whether an estimated biological age of a subject in an acquired image is less than a defined age threshold; a means for determining whether a temporal difference between a first acquisition time logically associated with the acquired image and a second acquisition time logically associated with a historical image that includes the subject and a first identifier logically associated with the subject is less than a defined temporal threshold; and a means for logically associating the first identifier with the acquired image responsive to determining the estimated age of the subject is less than the defined age threshold and the temporal difference is less than the defined temporal threshold.

Example 34 may include elements of example 33 where the means for determining whether an estimated biological age of a subject in an acquired image is less than a defined age threshold may include a means for receiving a signal that includes data or information representative of the acquired image; and a means for determining the estimated biological age of the subject included in the acquired image.

Example 35 may include elements of example 34 where the means for determining whether an estimated biological age of a subject in an acquired image is less than a defined age threshold may include a means for determining whether the subject in the acquired image is an infant by determining whether the estimated biological age of a subject in the acquired image is less than a first defined age threshold equal to 12 months.

Example 36 may include elements of example 34 where the means for determining whether a temporal difference between a first acquisition time logically associated with the acquired image and a second acquisition time logically associated with a historical image that includes the subject and a first identifier logically associated with the subject is less than a defined temporal threshold may include a means for determining an age-dependent temporal threshold based at least in part on the estimated biological age of the subject in the acquired image.

Example 37 may include elements of example 34 where the means for determining whether a temporal difference between a first acquisition time logically associated with the acquired image and a second acquisition time logically associated with a historical image that includes the subject and a first identifier logically associated with the subject is less than a defined temporal threshold may include a means for selecting an age-dependent temporal threshold based on the estimated biological age of the subject in the acquired image.

Example 38 may include elements of example 37, and may additionally include a means for logically associating the first identifier with the acquired image responsive to determining the estimated age of the subject is greater than the defined age threshold and the temporal difference is less than the age-dependent temporal threshold.

Example 39 may include elements of example 33, and may additionally include a means for soliciting user input that includes at least a new subject identifier responsive to determining the estimated age of the subject in the acquired image is less than the defined age threshold and the temporal difference is greater than the temporal threshold; and a means for logically associating the new subject identifier with the acquired image.

Example 40 may include elements of example 33, and may additionally include a means for soliciting user input that includes at least a new subject identifier responsive to failing to locate a historical image that includes the subject in the acquired image; and a means for logically associating the new subject identifier with the acquired image.

According to example 41, there is provided system to identify a subject in an acquired image, the system being arranged to perform the method of any of examples 17 through 24.

According to example 42, there is provided a chipset arranged to perform the method of any of examples 17 through 24.

According to example 43, there is provided a machine-readable storage device comprising a plurality of instructions that, in response to be being executed on a computing device, cause the computing device to carry out the method according to any of examples 17 through 24.

According to example 44, there is provided a device configured to identify a subject in an acquired image, the device being arranged to perform the method of any of examples 17 through 24.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed:

1. A facial recognition system, comprising:
   an image sensor;
   biological age estimator circuitry coupled to the image sensor, the biological age estimator circuitry to:
      determine whether an estimated biological age of a subject in a current image acquired by the image sensor is less than a defined age threshold;
   age comparator circuitry coupled to the image sensor, a data storage device, and the biological age estimator circuitry, the age comparator circuitry to:
      select a temporal difference threshold, the selected temporal difference threshold proportionate to the estimated biological age of the subject in the current image;
      determine whether a temporal difference between an acquisition time logically associated with the current image and an acquisition time logically associated with a historical image that includes the subject and a logically associated subject identifier is less than the selected temporal difference threshold; and
   image labeling circuitry coupled to the image sensor, the age comparator circuitry, and the biological age estimator circuitry, the image labeling circuitry to:
      logically associate the subject identifier with the current image responsive to determining the estimated biological age of the subject is less than the defined age threshold and the temporal difference is less than the selected temporal difference threshold.

2. The facial recognition system of claim 1, the biological age estimator circuitry to further:
   receive a signal from the image sensor, the signal including data or information representative of the current image that includes the subject; and
   determine the estimated biological age of the subject included in the signal received from the image sensor.

3. The facial recognition system of claim 2, the biological age estimator circuitry to further:
   determine whether the subject is an infant by determining whether the estimated biological age of a subject in the image acquired by the image sensor is less than a first defined age threshold equal to 12 months.

4. The facial recognition system of claim 1, the image labeling circuitry to further:
   logically associate the subject identifier with the current image responsive to determining the estimated age of the subject is greater than the defined age threshold and the temporal difference is less than the selected temporal difference threshold.

5. The facial recognition system of claim 1, the image labeling circuitry to further:
   solicit user input that includes at least a new subject identifier responsive to determining the estimated age of the subject is less than the defined age threshold and the temporal difference is greater than the selected temporal difference threshold; and
   logically associate the new subject identifier with the current image.

6. The facial recognition system of claim 1, the image labeling circuitry to further:
   solicit user input that includes at least a new subject identifier responsive to failing to locate a historical image that includes the subject; and
   logically associate the new subject identifier with the current image.

7. A facial recognition controller, comprising:
   biological age estimator circuitry coupled to an image sensor, the biological age estimator circuitry to:
      determine whether an estimated biological age of a subject in a current image acquired by the image sensor is less than a defined age threshold;
   age comparator circuitry coupled to the image sensor, a data storage device, and the biological age estimator circuitry, the age comparator circuitry to:
      select a temporal difference threshold, the selected temporal difference threshold proportionate to the estimated biological age of the subject in the current image; and
      determine whether a temporal difference between an acquisition time logically associated with the current image and an acquisition time logically associated with a historical image that includes the subject and a logically associated subject identifier is less than the selected temporal difference threshold; and
   image labeling circuitry coupled to the image sensor, the age comparator circuitry, and the biological age estimator circuitry, the image labeling circuitry to:
      logically associate the subject identifier with the current image responsive to determining the estimated biological age of the subject is less than the defined age threshold and the temporal difference is less than the selected temporal difference threshold.

8. The controller of claim 7, the biological age estimator circuitry to further:
   receive a signal from the image sensor, the signal including data or information representative of the current image that includes the subject; and
   determine the estimated biological age of the subject included in the signal received from the image sensor.

9. The controller of claim 8, the biological age estimator circuitry to further:
   determine whether the subject is an infant by determining whether the estimated biological age of a subject in the current image is less than a first defined age threshold equal to 12 months.

10. The controller of claim 7, the image labeling circuitry to further:
    logically associate the subject identifier with the current image responsive to determining the estimated age of the subject is greater than the defined age threshold and the temporal difference is less than the selected temporal difference threshold.

11. The controller of claim 7, the image labeling circuitry to further:
    solicit user input that includes at least a new subject identifier responsive to determining the estimated age of the subject is less than the defined age threshold and the temporal difference is greater than the selected temporal difference threshold; and
    logically associate the new subject identifier with the current image.

12. The controller of claim 7, the image labeling circuitry to further:
    solicit user input that includes at least a new subject identifier responsive to failing to locate a historical image that includes the subject; and
    logically associate the new subject identifier with the current image.

13. An image classification method, comprising:
- determining, by biological age estimator circuitry, whether an estimated biological age of a subject in a current image acquired by an image sensor communicably coupled to the biological age estimator circuitry is less than a defined age threshold;
- selecting, by age comparator circuitry coupled to the biological age estimator circuitry, a temporal difference threshold proportionate to the estimated biological age of the subject in the current image
- determining by the age comparator circuitry, whether a temporal difference between an acquisition time logically associated with the current image and an acquisition time logically associated with a historical image stored on a communicably coupled storage device is less than the selected temporal difference threshold, the historical image including the subject and a logically associated subject identifier; and
- logically associating, by image labeling circuitry coupled to the biological age estimator circuitry and the age comparator circuitry, the subject identifier with the current image responsive to determining the estimated age of the subject is less than the defined age threshold and the temporal difference is less than the selected temporal difference threshold.

14. The method of claim 13 wherein determining whether an estimated biological age of a subject in a current image is less than a defined age threshold comprises:
- receiving a signal from the image sensor by the biological age estimator circuitry, the signal including data or information representative of the current image that includes the subject; and
- determining, by the biological age estimator circuitry, the estimated biological age of the subject included in the current image.

15. The method of claim 14 wherein determining whether an estimated biological age of a subject in a current image is less than a defined age threshold comprises:
- determining, by the biological age estimator circuitry, whether the subject is an infant by determining whether the estimated biological age of a subject in the current image is less than a first defined age threshold equal to 12 months.

16. The method of claim 13, further comprising:
- logically associating, by the image labeling circuitry, the subject identifier with the current image responsive to determining the estimated age of the subject is greater than the defined age threshold and the temporal difference is less than the selected temporal difference threshold.

17. The method of claim 13, further comprising:
- soliciting, by the image labeling circuitry, user input that includes at least a new subject identifier responsive to determining the estimated age of the subject is less than the defined age threshold and the temporal difference is greater than the selected temporal difference threshold; and
- logically associating, by the image labeling circuitry, the new subject identifier with the subject in the current image.

18. The method of claim 13, further comprising:
- soliciting, by the image labeling circuitry, user input that includes at least a new subject identifier responsive to failing to locate a historical image that includes the subject; and
- logically associating, by the image labeling circuitry, the new subject identifier with the current image.

19. A non-transitory storage device that includes machine-readable instructions that, when executed by a circuit, cause the circuit to provide a facial recognition controller that, in operation:
- causes biological age estimator circuitry to determine whether an estimated biological age of a subject in a current image acquired by a communicably coupled image sensor is less than a defined age threshold;
- causes age comparator circuitry coupled to the biological age estimator circuitry to select a temporal difference threshold proportionate to the estimated biological age of the subject in the current image;
- causes the age comparator circuitry to determine whether a temporal difference between an acquisition time logically associated with the current image and an acquisition time logically associated with a historical image that includes the subject and a logically associated subject identifier is less than the selected temporal difference threshold; and
- causes image labeling circuitry coupled to the biological age estimator circuitry and to the age comparator circuitry to logically associate the subject identifier with the current image responsive to determining the estimated biological age of the subject is less than the defined age threshold and the temporal difference is less than the selected temporal difference threshold.

* * * * *